US005160127A

United States Patent [19]

Lin

[11] Patent Number: 5,160,127

[45] Date of Patent: Nov. 3, 1992

[54] HOLD-DOWN DEVICE FOR MOVABLE JAW OF A VISE

[76] Inventor: Philip Lin, No. 537-8, Chung-San Rd., Ching-Shui Chen, Taichung Shien, Taiwan

[21] Appl. No.: 769,660

[22] Filed: Oct. 2, 1991

[51] Int. Cl.$^5$ .............................................. B23Q 3/02

[52] U.S. Cl. .............................................. 269/136

[58] Field of Search .............................. 269/134–138, 269/229, 232, 233, 235, 236

[56] References Cited

U.S. PATENT DOCUMENTS

| | | | |
|---|---|---|---|
| 1,206,399 | 11/1916 | Bartlett | 269/138 |
| 2,818,786 | 1/1958 | Hammer | 269/138 |
| 4,299,377 | 11/1981 | Lenz | 269/136 |
| 4,345,750 | 8/1982 | Olaser | 269/136 |

FOREIGN PATENT DOCUMENTS

| | | | |
|---|---|---|---|
| 971458 | 7/1950 | France | 269/138 |

*Primary Examiner*—Robert C. Watson

*Attorney, Agent, or Firm*—Browdy and Neimark

[57] ABSTRACT

A hold-down device for movable jaw of a vise comprises a driving block and a movable jaw member. The driving block is provided with a through hole having therein a rigid sleeve. The movable jaw member comprises therein a drive shaft in such manners that the drive shaft passes through the sleeve and that both ends of the drive shaft are able to rotate. Located between the sliding portion of the driving block and the sliding groove of the vise base is a predetermined clearance, within which the driving block moves upwardly. A screw is permitted to pass through the screw hole of the movable jaw member to press against the side adjacent to the driving block and the screw hole so as to permit the angle formed by the surface of the vise stand and the connection line, which is formed by the contact point of the sleeve and the drive shaft and the drive shaft axial line, to be greater than zero degree and smaller than 90 degrees.

2 Claims, 2 Drawing Sheets

HOLD-DOWN DEVICE FOR MOVABLE JAW OF A VISE

BACKGROUND OF THE INVENTION

The present invention relates to a vise, and more particularly to a hold-down device for movable jaw of a vise.

The hold-down device for movable jaw of a vise was described in the U.S. Pat. No. 2,880,638. As shown in FIG. 1, the hold-down device for movable jaw of a vise holds a work piece by making use of the bevel 48 of a driving block 46 to exert via a semi-spherical piece 50 a downward component force on the movable jaw member 40, which is therefore held down so as to keep the holding surface of the vise jaw 68 in a precise vertical position in relation to the surface of the vise stand.

Such hold-down device for movable jaw of a vise of the prior art is defective in design in that the neck 49 of the driving block 46 and the adjacent area thereof are subjected to a substantial bending stress, which is often responsible for the crack of the driving block 46, and that the hold-down device is apparently unable to initiate an effective hold-down action when the vise is holding the work piece 153 (as shown in dotted lines in FIG. 4) in a pulling manner. In other words, the hold-down device for movable jaw of a vise of the prior art works only when the vise is holding the work piece 153 in a compressing manner.

SUMMARY OF THE INVENTION

It is therefore the primary objective of the present invention to provide a hold-down device for movable jaw of a vise with means capable of minimizing the effect of bending stress on the driving block so as to permit the vise to be equipped with a higher vise jaw plate to hold securely the work piece having a greater height.

It is another objective of the present invention to provide the hold-down device for movable jaw of a vise with means permitting the hold-down device to effect the hold-down action on the movable jaw when the vise is holding the work piece in a pulling manner.

The features and objectives of the present invention will be better understood by studying the following detailed description of the preferred embodiment, in conjunction with the drawings provided herein.

DETAILED DESCRIPTION OF THE PREFERRED EMBODIMENT

Figure 1:
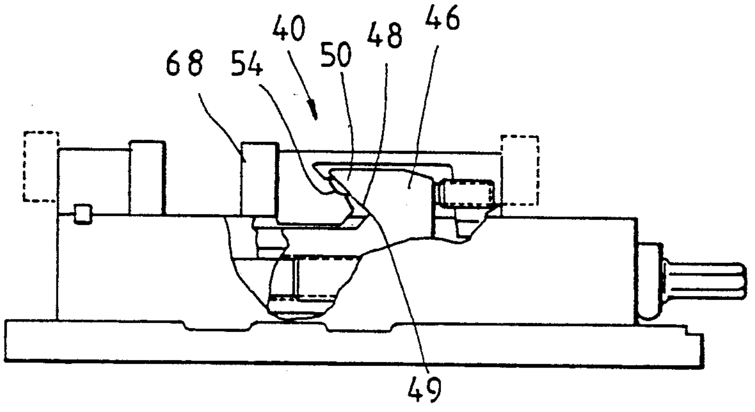
FIG. 1 PRIOR ART
FIG. 1 shows a sectional view of a prior art vise having a movable jaw hold-down device.
Figure 2:
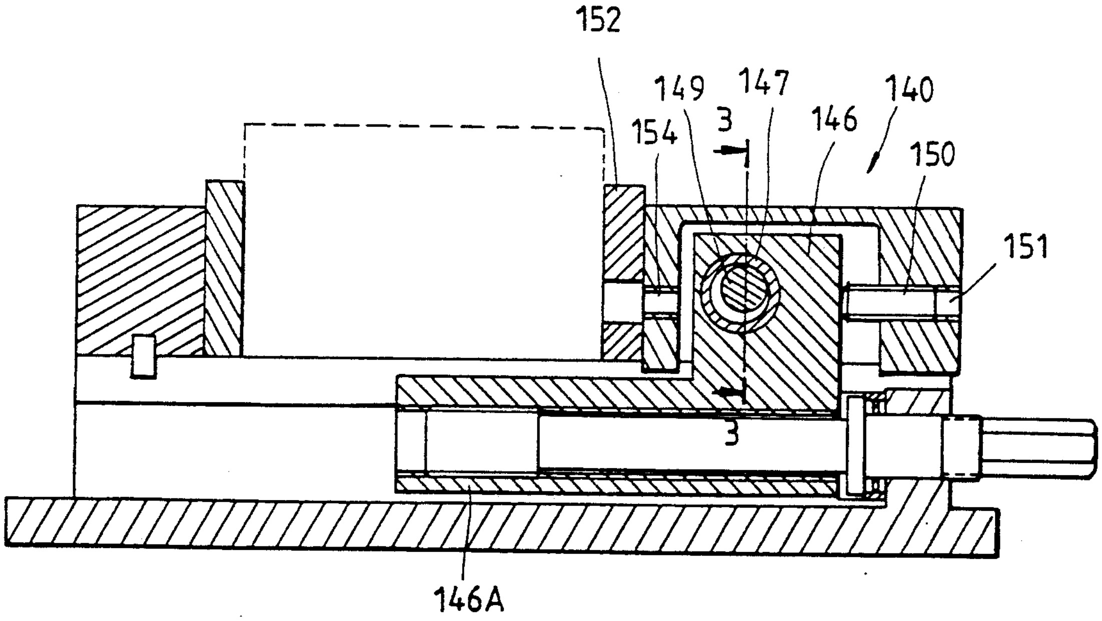
FIG. 2 shows a partial sectional view of central longitudinal face of the hold-down device for movable jaw of a vise according to the present invention.
Figure 3:
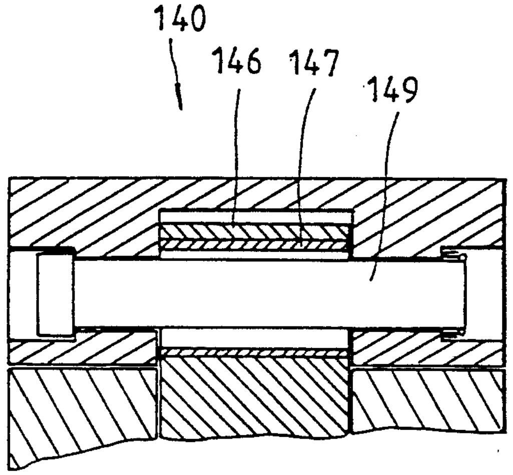
FIG. 3 shows a sectional view of the portion taken along line 3—3 as shown in FIG. 2.

Referring to FIGS. 2 and 3, the vise embodied in the present invention is shown comprising a driving block 146 having therein a through hole, which receives therein a rigid sleeve 147 fitting over a drive shaft 149 capable of rotating in the movable jaw 140. Located between the sliding portion 146A of the driving block 146 and the sliding groove (not shown in the drawings) of the vise base is a predetermined clearance, within which the driving block 146 moves upwardly.

In order to use the vise to hold the work piece in a compressing manner, a screw 150 is permitted to pass through the screw hole 151 to press against one side of driving block 146 so as to allow the driving block 146 to make contact with the drive shaft 149 via the rigid sleeve 147. In order to generate a hold-down action on the movable jaw under the circumstance described above, the bevel angle, which is formed by the line connecting the contact point of the rigid sleeve 147 and the drive shaft 149 with the drive shaft axial line in relation to the surface of the vise stand, must be greater than zero degree and smaller than 90 degrees. Geometrically speaking, the size of the bevel angle is dependent on the height difference between the axial line of the sleeve 147 and the axial line of the drive shaft 149 in addition to the radii of the sleeve 147 and the drive shaft 149. As far as the force holding the work piece and the hold-down force exerting on the drive shaft 149 by the driving block 146 are concerned, the bevel angle should be greater if an accurate vertical angle of the vise jaw plate in relation to the vise stand is desired. Therefore, the vise manufacturer can determine the bevel angle to meet the client's specific requirement by means of selecting the relationship of the position and the size of the sleeve 147 and the drive shaft 149. As shown in FIG. 2, the bevel angle is approximately 45 degrees.

Figure 4:
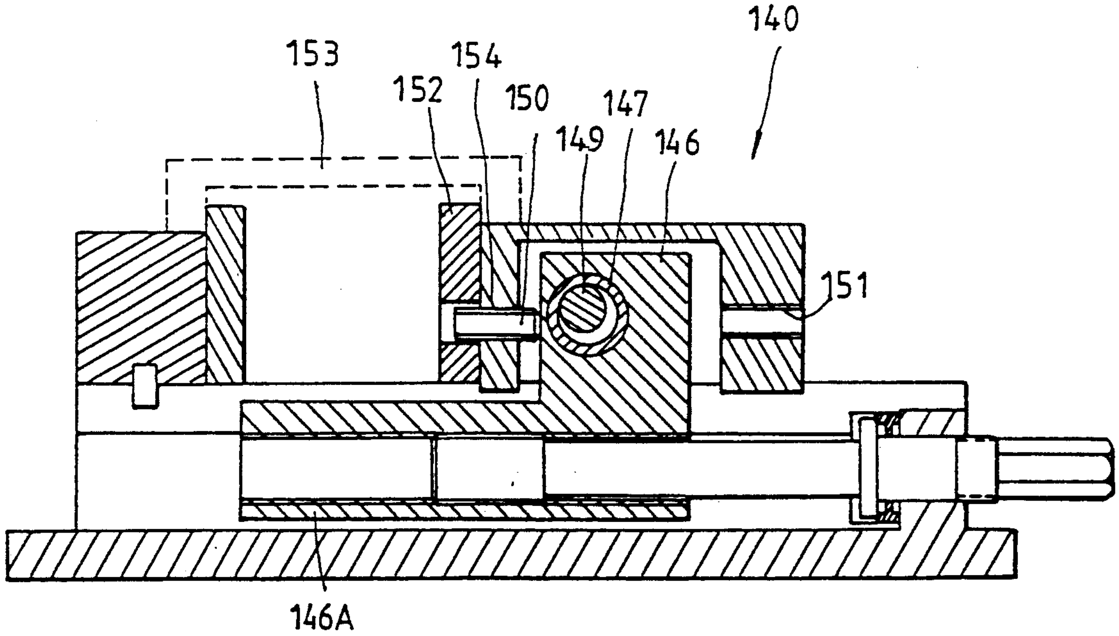
FIG. 4 is similar to FIG. 2 and shows a schematic view of the preferred embodiment of the present invention at work under different circumstance in relation to FIG. 2.

In addition, a screw hole 154 can be arranged at the end adjacent to the movable jaw 140 and the vise jaw plate 152 so as to permit the vise of the present invention to hold a work piece 153 in a pulling manner, as shown in FIG. 4. The screw 150 can be removed from the screw hole 151 and inserted into the screw hole 154 in order to press against the side adjacent to the driving block 146. As a result, the hold-down force will be exerted on the movable jaw 140 holding the work piece 153 in a pulling manner when the vise handle (not shown in the drawing) is rotated.

The embodiment of the present invention described above is to be considered in all respects as merely illustrative and not restrictive. Accordingly, the present invention may be embodied in other specific forms without deviating from the spirit thereof. For example, the driving block may be devoid of the sleeve, and the through hole of the driving block can be appropriately hardened. In addition, the cross sections of the through hole and the sleeve can be oval or any shape other than circular.

I claim:

1. A hold-down device for a movable jaw of a vise comprising:

a driving block (146), said driving block having a through hole, said through hole lined with a sleeve (147) made from a hardened material, a movable jaw member (140) having a drive shaft (149) rotatably mounted therethrough, said rotatably mounted drive shaft (149) passing through said through hole of said driving block (146), a first movable jaw adjustment means for engaging said drive shaft (149) against said hardened sleeve (147) toward a rear end of said movable jaw (140)

while permitting limited rotation of said drive shaft when said movable jaw member is moved, a second movable jaw adjustment means for engaging said drive shaft (149) against said hardened sleeve (147) toward a front end of said movable jaw (140) while permitting limited rotation of said drive shaft when said movable jaw member is moved, wherein, said first movable jaw adjustment means is engaged when the workpiece is held in the vise in compression and said second movable jaw adjustment means is engaged when the workpiece is held in the vise in tension.

2. A hold-down device in accordance with claim 1, wherein the geometric relation between said drive shaft (149) and said sleeve (147) is such that the contact angle between said sleeve (147) and said drive shaft (149) and the bevel angle of the connection line of the axis of said drive shaft to the surface of the vise stand must be greater than zero degrees and smaller than 90 degrees, thereby permitting said driving block to impart simultaneously a determined clamping force and the hold-down force to said movable jaw member (140).

* * * * *